(12) United States Patent
Umezawa

(10) Patent No.: US 6,600,577 B1
(45) Date of Patent: Jul. 29, 2003

(54) IMAGE READ APPARATUS AND IMAGE READ METHOD

(75) Inventor: Noriyuki Umezawa, Yokohama (JP)

(73) Assignees: Kabushiki Kaisha Toshiba, Kawasaki (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/469,248

(22) Filed: Dec. 22, 1999

(30) Foreign Application Priority Data

Dec. 22, 1998 (JP) .......................... 10-365610

(51) Int. Cl.⁷ .............................. H04N 1/40
(52) U.S. Cl. .................. 358/446; 358/446; 358/442; 358/483; 358/468; 358/451; 358/409; 358/482; 358/445
(58) Field of Search .............. 358/446, 442, 358/483, 468, 451, 409, 482, 445

(56) References Cited

U.S. PATENT DOCUMENTS

| | | | |
|---|---|---|---|
| 4,742,240 A | 5/1988 | Yamanishi et al. | 250/578 |
| 4,763,007 A | 8/1988 | Takahashi | 250/578 |
| 5,274,476 A | 12/1993 | Lee | 358/483 |
| 5,347,372 A | 9/1994 | Takahashi et al. | 358/471 |
| 6,204,910 B1 * | 3/2001 | Iwai | 355/41 |

FOREIGN PATENT DOCUMENTS

| | | |
|---|---|---|
| JP | 2-177677 | 7/1990 |
| JP | 5-161008 | 6/1993 |
| JP | 9-261474 | 10/1997 |
| JP | 11-146155 | 5/1999 |
| JP | 11-215298 | 8/1999 |

* cited by examiner

Primary Examiner—Edward Coles
Assistant Examiner—Heather D Gibbs
(74) Attorney, Agent, or Firm—Foley & Lardner (57) ABSTRACT

A left-side odd-component image signal (ODDL) output from an output terminal (OS1) of a 4-channel output CCD (4-division photoelectric conversion element) is input to an amplifier. A left-side even-component image signal (EVENL) output from an output terminal (OS2) of the 4-channel output CCD is input to the amplifier. A right-side odd-component image signal (ODDR) output from an output terminal (OS3) of the 4-channel output CCD is input to another amplifier. A right-side even-component image signal (EVENR) output from an output terminal (OS4) of the 4-channel output CCD is input to the amplifier. The amplifiers multiplex the left-side and right-side signals respectively, and a high-speed scanner control ASIC performs right/left correction.

3 Claims, 8 Drawing Sheets

IMAGE READ APPARATUS AND IMAGE READ METHOD

BACKGROUND OF THE INVENTION

The present invention relates to an image read apparatus and an image read method, wherein the image read apparatus is provided in an image forming apparatus such as an electronic copying machine and optical image information from a document is received by a 4-division photoelectric conversion element to read an image of the document.

In a conventional image forming apparatus such as an electronic copying machine, in order to increase an image read rate, a pre-processing system is constituted by using a 4-channel output CCD (4-division photoelectric conversion element) and an amplifier (AMP).

In this pre-processing system, in order to reduce influence upon image data due to a difference in signal transmission paths, a left odd output component a1 and a right odd output component a2 of a 4-channel output of the CCD (one line being divided into left and right components, and each of the left and right components being divided into odd components and even components) are amplified by an amplifier A, and a left even output component b1 and a right even output component b2 are amplified by an amplifier B. Thus, a variance and an influence of the amplifiers between left and right sides are reduced.

A correction means is provided to correct one of the odd output components a1 and a2 amplified by the amplifier A so that the signal levels of both components at points corresponding to the center of the signal line may be equalized. In addition, another correction means is provided to correct one of the even output components b1 and b2 amplified by the amplifier B so that the signal levels of both components at points corresponding to the center of the signal line may be equalized. Thus, the image data is corrected and the signal sequence of image data (4-channel outputs of the CCD) is regulated.

The outputs of the CCD, however, are analog outputs and susceptible to crosstalk on the circuit board, crosstalk in the LSI (amplifier), or influence of switching at the time of multiplexing. If the image read rate is to be further increased, such influence may occur more seriously. Under the circumstances, if the left and right odd output components of the 4-channel output of the CCD and the left and right even output components are amplified by the respective amplifiers, these output components may be adversely affected by crosstalk on the circuit board, crosstalk in the LSI (amplifier) or switching at the time of multiplexing. Consequently, an output image may become a ghost image due to right-and-left variance.

BRIEF SUMMARY OF THE INVENTION

The object of the present invention is to provide an image reading apparatus capable of reading an output image with high fidelity to an original, without influence of switching at the time of crosstalk multiplexing between output signals in a case where a 4-division photoelectric conversion element is used.

To achieve the object, according to an aspect of the present invention, there is provided an image reading apparatus comprising:

a 4-division photoelectric conversion element for receiving light at four division image-feed areas consisting of an odd area located on a left side in a main scan direction, an odd area on a right side in the main scan direction, an even area on the left side in the main scan direction, and an even area on the right side in the main scan direction;

a first amplifier for synthesizing and amplifying output signals from the left-side odd area and left-side even area of the four division areas of the 4-division photoelectric conversion element which has received light;

a second amplifier for synthesizing and amplifying output signals from the right-side odd area and right-side even area of the four division areas of the 4-division photoelectric conversion element which has received light; and a correction circuit for performing right/left correction between an output from the first amplifier which has synthesized the output signals from the left-side areas and an output from the second amplifier which has synthesized the output signals from the right-side areas.

According to another aspect of the invention, there is provided an image reading apparatus comprising:

a 4-division photoelectric conversion element for receiving light at four division image-feed areas consisting of an odd area located on a left side in a main scan direction, an odd area on a right side in the main scan direction, an even area on the left side in the main scan direction, and an even area on the right side in the main scan direction;

a first selector for selecting one of output signals from the left-side even area and right-side odd area of the four division areas of the 4-division photoelectric conversion element which has received light;

a first amplifier for synthesizing and amplifying an output signal from the left-side even area and one of the output signals, which has been selected by the first selector, from the left-side even area and right-side odd area of the four division areas of the 4-division photoelectric conversion element which has received light;

a second amplifier for synthesizing and amplifying an output signal from the right-side even area and one of the output signals, which has been selected by the first selector, from the left-side even area and right-side odd area of the four division areas of the 4-division photoelectric conversion element which has received light;

a first bus width conversion circuit for dividing the output signal from the left-side odd area amplified and synthesized by the first amplifier, and one of the output signals, which has been selected by the first selector, from the left-side even area and the right-side odd area;

a second bus width conversion circuit for dividing the output signal from the right-side even area amplified and synthesized by the second amplifier, and one of the output signals, which has been selected by the first selector, from the left-side even area and the right-side odd area;

a second selector for selecting one of the output signals, which has been divided by the first bus width conversion circuit, from the left-side even area and the right-side odd area, and one of the output signals, which has been divided by the second bus width conversion circuit, from the left-side even area and the right-side odd area;

a correction circuit for correcting left-side and right-side output signals with respect to the output signal from the left-side odd area, which has been divided by the first bus width conversion circuit, one of the output signals from the left-side even area and right-side odd area, which has been selected by the second selector, the output signal from the right-side even area, which has been divided by the second bus width conversion circuit, and one of the output signals from the left-side even area and right-side odd area, which has been selected by the second selector; and a control circuit for controlling the output signals selected by the first selector and the second selector.

According to still another aspect of the invention, there is provided an image reading method comprising the steps of:

providing a 4-division photoelectric conversion element for receiving light at four division image-feed areas consisting of an odd area located on a left side in a main scan direction, an odd area on a right side in the main scan direction, an even area on the left side in the main scan direction, and an even area on the right side in the main scan direction;

synthesizing and amplifying output signals from the left-side odd area and left-side even area of the four division areas of the 4-division photoelectric conversion element which has received light;

synthesizing and amplifying output signals from the right-side odd area and right-side even area of the four division areas of the 4-division photoelectric conversion element which has received light; and performing right/left correction between an output obtained by synthesizing and amplifying the output signals from the left-side areas and an output obtained by synthesizing and amplifying the output signals from the right-side areas.

According to still another aspect of the invention, there is provided an image reading method comprising the steps of:

providing a 4-division photoelectric conversion element for receiving light at four division image-feed areas consisting of an odd area located on a left side in a main scan direction, an odd area on a right side in the main scan direction, an even area on the left side in the main scan direction, and an even area on the right side in the main scan direction; and selecting one of two modes:

one of the two modes being such that output signals from the left-side odd area and left-side even area of the four division areas of the 4-division photoelectric conversion element which has received light are synthesized and amplified, and output signals from the right-side even area and left-side even area are synthesized and amplified, and the other of the two modes being such that output signals from the left-side odd area and right-side odd area of the four division areas of the 4-division photoelectric conversion element which has received light are synthesized and amplified, and output signals from the right-side even area and right-side odd area are synthesized and amplified.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
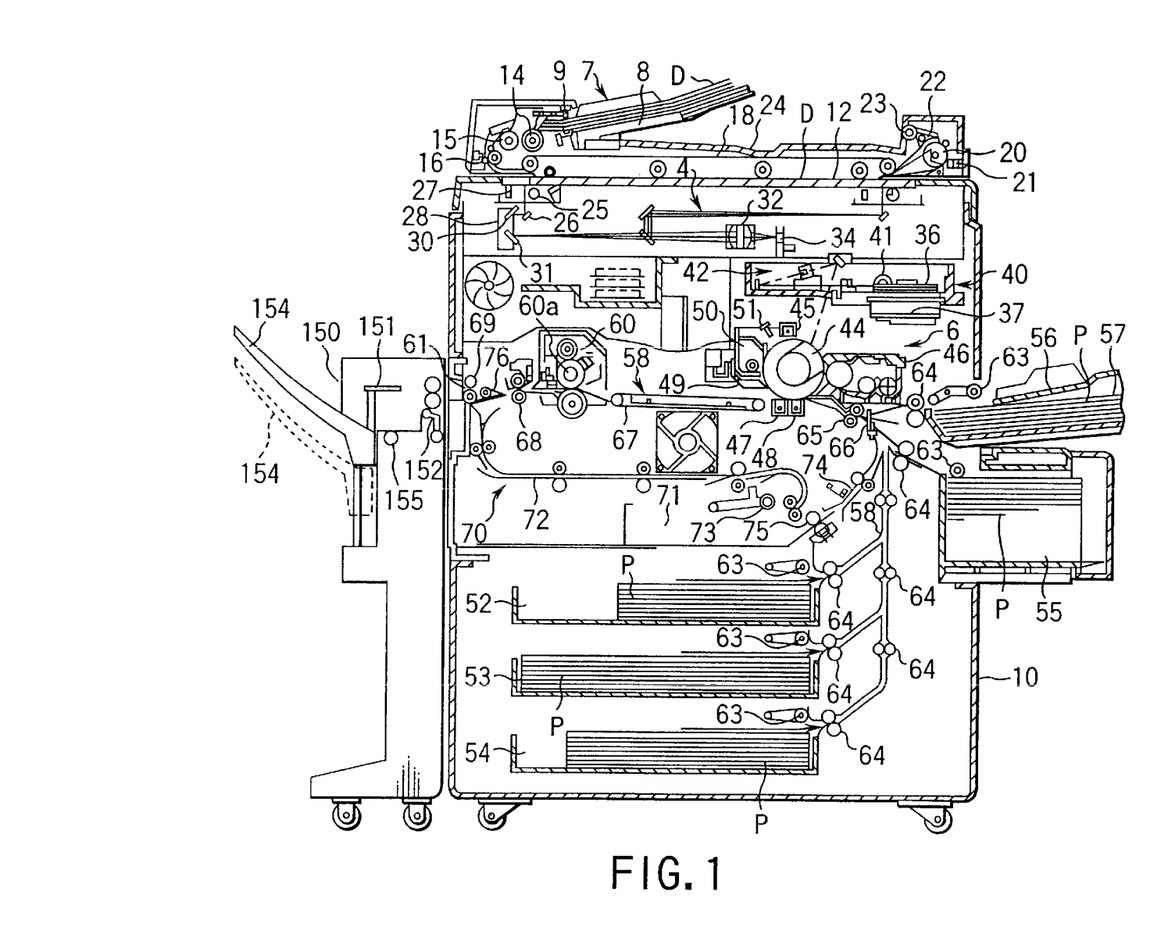
FIG. 1 is a cross-sectional view showing an internal structure of a digital copying machine according to the present invention.

FIG. 1 is a cross-sectional view showing an internal structure of a digital copying machine (DPPC) using a 4-channel output CCD (4-division photoelectric conversion element) capable of performing high-speed processing according to the present invention. As is shown in FIG. 1, the digital copying machine has an apparatus main body 10. The apparatus main body 10 incorporates a scanner section 4 functioning as an image reading means and a printer section 6 functioning as an image forming means.

An original table 12 formed of transparent glass, on which a read object, i.e. an original D is placed, is disposed on the upper surface of the apparatus main body 10. An automatic document feeder 7 (hereinafter referred to as "ADF") for automatically feeding originals onto the original table 12 is disposed on the upper surface of the apparatus main body 10. The ADF 7 is disposed to be opened/closed with respect to the original table 12 and serves as an original cover for bringing the original D placed on the original table 12 into close contact with the original table 12.

The ADF 7 has an original tray 8 on which the original D is set; an empty sensor 9 for detecting the presence/absence of originals; pickup rollers 14 for picking up originals on the original tray 8 one by one; a feed roller 15 for conveying the picked-up original; an aligning roller pair 16 for aligning the leading edges of the originals; and a conveyor belt 18 disposed to cover almost the entire surface of the original table 12. A plurality of originals set on the original tray 8 with their surfaces facing up are sequentially taken out from the lowermost page, i.e. the last page, aligned by the aligning roller pair 16, and conveyed to a predetermined position on the original table 12 by the conveyor belt 18.

In the ADF 7, a reversing roller 20, a non-reverse sensor 21, a flapper 22 and a delivery roller 23 are disposed at the end portion on the opposite side of the aligning roller pair 16 with respect to the conveyor belt 18. The original D whose image information has been read by the scanner section 4 (to be described later) is fed from the original table 12 by the conveyor belt 18 and delivered to an original delivery section 24 on the ADF 7 through the reversing roller 20, flapper 21 and delivery roller 22. To read the lower surface of the original D, the flapper 22 is switched. The original D conveyed by the conveyor belt 18 is reversed by the reversing roller 20 and fed to a predetermined position on the original table 12 again by the conveyor belt 18.

The scanner section 4 provided in the apparatus main body 10 has an exposure lamp 25 as a light source for illuminating the original D placed on the original table 12, and a first mirror 26 for deflecting reflection light from the original D in a predetermined direction. The exposure lamp 25 and first mirror 26 are attached to a first carriage 27 disposed under the original table 12.

The first carriage 27 is disposed to be movable in parallel to the original table 12 and reciprocallly moved under the original table 12 by a scanning motor (not shown) through a toothed belt (not shown), etc.

A second carriage 28 movable in parallel to the original table 12 is disposed under the original table 12. Second and third mirrors 30 and 31 for sequentially deflecting reflection light from the original D, which has been deflected by the first mirror 26, are attached to the second carriage 28 at right angles with each other. The second carriage 28 is moved by, e.g. the toothed belt for driving the first carriage 27 along with the first carriage 27, and moved in parallel along the original table 12 at half the speed of the first carriage.

An imaging lens 32 for focusing reflection light from the third mirror 31 mounted on the second carriage 28, and a 4-channel output CCD (photoelectric conversion element) 34 for receiving the reflected light focused by the imaging lens and photoelectrically converting it are also disposed under the original table 12. The imaging lens 32 is disposed in a plane including the optical axis of the light deflected by the third mirror 31 so as to be movable by means of a driving mechanism. The imaging lens 32 moves to focus the reflection light at a desired magnification. The 4-channel output CCD 34 photoelectrically converts the incoming reflection light and outputs an electrical signal corresponding to the read original D.

On the other hand, the printer section 6 has a laser exposure unit 40 functioning as a latent image forming means. The laser exposure unit 40 comprises a semiconductor laser 41 as a light source; a polygon mirror 36 as a scanning member for continuously deflecting a laser beam emitted by the semiconductor laser 41; a polygon motor 37 as a scanning motor for rotatably driving the polygon mirror 36 at a predetermined rotational speed (to be described later); and an optical system 42 for deflecting the laser beam from the polygon mirror and guiding the beam to a photosensitive drum 44 (to be described later). The laser exposure unit 40 with the above structure is fixed to a support frame (not shown) of the apparatus main body 10.

The semiconductor laser 41 is ON/OFF-controlled in accordance with the image information of the original D read by the scanner section 4 or facsimile transmission/ reception document information. The laser beam is directed to the photosensitive drum 44 through the polygon mirror 36 and optical system 42 to scan the outer surface of the photosensitive drum 44, thereby forming an electrostatic latent image on the outer peripheral surface of the photosensitive drum 44.

The printer section 6 has the rotatable photosensitive drum 44 as an image carrier disposed almost at the center of the apparatus main body 10. The outer peripheral surface of the photosensitive drum 44 is exposed to the laser beam from the laser exposure unit 40, and so a desired electrostatic latent image is formed thereon. Around the photosensitive drum 44, the following elements are arranged in the named order: a charger 45 for electrifying the outer peripheral surface of the drum with a predetermined charge; a developing device 46 for supplying toner as a developer to the electrostatic latent image formed on the outer peripheral surface of the photosensitive drum 44 to develop it at a desired image density; a transfer charger 48 which is integrated with a separation charger 47 for separating a target transfer material, i.e. a copy paper sheet P fed from a paper cassette (to be described later) from the photosensitive drum 44 and transfers the toner image formed on the photosensitive drum 44 onto the paper sheet P; a separation gripper 49 for separating the copy paper sheet P from the outer peripheral surface of the photosensitive drum 44; a cleaning unit 50 for removing toner remaining on the outer peripheral surface of the photosensitive drum 44; and a discharger 51 for de-electrifying the outer peripheral surface of the photosensitive drum 44.

An upper cassette 52, a middle cassette 53 and a lower cassette 54 which can be drawn out of the apparatus main body are stacked at the lower portion of the apparatus main body 10. These cassettes store copy paper sheets of different sizes. A large-capacity feeder 55 is disposed on one side of these cassettes. This large-capacity feeder 55 stores about 3,000 copy paper sheets P having a size with high use frequency, e.g. copy paper sheets P with A4 size. A feed cassette 57 also serving as a manual feed tray 56 is detachably attached above the large-capacity feeder 55.

A convey path 58 extending from the cassettes and large-capacity feeder 55 through a transfer section located between the photosensitive drum 44 and transfer charger 48 is formed in the apparatus main body 10. A fixing unit 60 having a fixing lamp 60a is disposed at the end of the convey path 58. A delivery port 61 is formed in the side wall of the apparatus main body 10, which is opposed to the fixing unit 60. A single-tray finisher 150 is attached to the delivery port 61.

Pickup rollers 63 for extracting the paper sheets P one by one from the cassettes or large-capacity feeder are arranged near each of the upper cassette 52, middle cassette 53, lower cassette 54 and feed cassette 57 and near the large-capacity feeder 55. A number of feed roller pairs 64 for conveying the copy paper sheet P extracted by the pickup rollers 63 through the convey path 58 are arranged in the convey path 58.

A registration roller pair 65 is arranged in the convey path 58 on the upstream side of the photosensitive drum 44. The registration roller pair 65 corrects a tilt of the extracted copy paper sheet P, registers the leading edge of the toner image on the photosensitive drum 44 and the leading edge of the copy paper sheet P, and feeds the copy paper sheet P to the transfer section at the same speed as the speed of movement of the outer peripheral surface of the photosensitive drum 44. A prealigning sensor 66 for detecting arrival of the copy paper sheet P is provided on the feed roller 64 side.

Each copy paper sheet P extracted from the cassette or large-capacity feeder 55 by the pickup rollers 63 is fed to the registration roller pair 65 by the feed roller pair 64. After the leading edge of the copy paper sheet P is aligned by the registration roller pair 65, the copy paper sheet P is fed to the transfer section.

In the transfer section, a development image, i.e. toner image formed on the photosensitive drum 44 is transferred onto the paper sheet P by the transfer charger 48. The copy paper sheet P on which the toner image has been transferred is separated from the outer peripheral surface of the photosensitive drum 44 by the function of the separation charger 47 and separation gripper 49 and conveyed to the fixing unit 60 through a conveyor belt 67 constituting part of the convey path 52. After the developer image is melted and fixed on the copy paper sheet P by the fixing unit 60, the copy paper sheet P is delivered onto the finisher 150 through the delivery port 61 by a feed roller pair 68 and a delivery roller pair 69.

An automatic double-side unit 70 for reversing the copy paper sheet P which has passed through the fixing unit 60 and feeding it to the registration roller pair 65 again is provided under the convey path 58. The automatic double-side unit 70 comprises a temporary stack 71 for temporarily stacking the copy paper sheets P; a reversing path 72 branched from the convey path 58 to reverse the copy paper sheet P which has passed through the fixing unit 60 and to guide the copy paper sheet P to the temporary stack 71; pickup rollers 73 for extracting the copy paper sheets P stacked on the temporary stack one by one; and a feed roller 75 for feeding the extracted paper sheet to the registration roller pair 65 through a convey path 74. A selector gate 76 for selectively distributing the copy paper sheets P to the delivery port 61 or reversing path 72 is provided at the branch portion between the convey path 58 and reversing path 72.

Where double-copying is performed, the copy paper sheet P which has passed through the fixing unit 60 is guided to the reversing path 72 by the selector gate 76, temporarily stacked on the temporary stack 71 in a reversed state, and fed to the registration roller pair 65 through the convey path 74 by the pickup rollers 73 and feed roller 75. The copy paper sheet P is registered by the registration roller pair 65 and fed to the transfer section again to transfer a toner image onto the blank surface of the copy paper sheet P. Thereafter, the copy paper sheet P is delivered to the finisher 150 through the convey path 58, fixing unit 60 and delivery rollers 69.

The finisher 150 staples delivered copies of documents and stores them in units of a copy. Each time a copy paper sheet P to be stapled has been delivered from the delivery port 61, a guide bar 151 aligns the copy paper sheet P to the stapling side. When all paper sheets have been delivered, a copy of copy paper sheets P is pressed by a paper press arm 152 and stapled by a stapler unit (not shown). Then the guide bar 151 moves downward. The stapled copy paper sheets P are delivered to a finisher delivery tray 154 by a finisher delivery roller 155 in units of a copy. The downward movement amount of the finisher delivery tray 154 is roughly determined in accordance with the number of copy paper sheets P to be delivered, and the finisher delivery tray 154 moves downward stepwise every time one copy is delivered. The guide bar 151 for aligning the delivered copy paper sheets P is located at such a high position that the guide bar 151 may not abut upon the already stapled copy paper sheets P placed on the finisher delivery tray 154.

The finisher delivery tray 154 is connected to a shift mechanism (not shown) which shifts (e.g. in four directions: front, rear, left and right sides) in units of a copy in the sort mode.

An operation panel 380 for inputting various copy conditions and a copy start signal for starting copying operation is provided at the upper portion on the front side of the apparatus main body 10.

A control system of the digital copying machine will now be described with reference to FIG. 2.

The control system of the digital copying machine is roughly divided into three blocks: a basic section 301 in which the scanner section 4 and printer section 6 are connected through an image processing section 5 to construct the digital copying machine; a page memory section 302 which receives image data from the basic section 301, records it, and transfers the recorded image data to the basic section 301 again to realize memory copy (electronic sort); and an expansion section 303 constructed by a mother board comprising a hard disk (HD) serving as a secondary memory for storing compressed image data in the page memory section 302, a FAX board (G4/G3•FAX control means) 369 for transmitting/receiving compressed image data to/from an external device through a public line, a LAN board (local area network line control means) 371 used to transfer data through a LAN, an expansion section CPU 361 for controlling these means through a system bus 373 and an ISA bus 374, a main memory 361a used by the expansion section CPU 361, and a DMAC 362 for controlling DMA transfer on the ISA bus 374.

The basic section 301 and page memory section 302 are connected through a basic section system interface 316 used to transfer control data and a basic section image interface 317 used to transfer image data. The page memory section 302 and expansion section 303 are connected through an expansion section system interface 376 used to transfer control data and an expansion section image interface 377 used to transfer image data.

A base section system bus 312 of the base section 301 and a page memory section system bus 310 of the page memory section 302 are connected through a section system interface 316.

The basic section 301 comprises the input means (scanner section) 4, output means (printer section) 6, image processing section 5, and a control means (basic section CPU) 311 for controlling these means.

The scanner section 4 has the 4-channel output CCD 34 having a plurality of light-receiving elements (1-line CCD) arrayed in lines. The 4-channel output CCD 34 reads the image of an original placed on the original table 12 in units of a line in accordance with an instruction from the basic section CPU 311, converts the density of the image into 8-bit digital data, and outputs the data to the image processing section 5 through a scanner interface (not shown) as time-series digital data along with a sync signal.

The basic section CPU 311 controls the means in the basic section 301 and means in the page memory section 302 (to be described later).

The page memory section 302 controls control information communication between the basic section CPU 311 in the basic section 301 and the expansion section CPU 361 in the expansion section 303, or controls access from the basic section 301 or expansion section 303 to a page memory 323. The page memory section 302 comprises a system control means 304 incorporating a communication memory 305; the storage means (page memory) 323 for temporarily storing image data; an address control section 306 for generating an address of the page memory 323; an image bus 320 used for data transfer between the respective devices in the page memory section 302; a control bus 321 used to control signal transfer between the respective devices in the page memory section 302 and the system control means 304; a data control means 307 for controlling data transfer in a case of data transfer between the page memory 323 and another device through the image bus 320; an image data I/F means 308 for interfacing image data in image data transfer between the basic section 301 and page memory section 302 through the basic section image interface 317; a resolution conversion/ binarization rotation means 325 for, when imaged data is to be transmitted to a device with a different resolution, converting the image data in accordance with the resolution of this device, converting image data received from a device with a different resolution in accordance with the resolution of the printer section 6 of the basic section 301, or executing 90° rotation processing of binary image data; a compression/ expansion means 324 for compressing input image data for a device for compressing image data and transmitting or storing it as in facsimile transmission or optical disk storage, or expanding compressed image data to make it visible through the printer section 6; and a multilevel rotation memory 309 connected to the image data I/F 308 to output the image data from the printer section 6 while rotating it through 90° or −90°.

The expansion section 303 comprises the control means (expansion section CPU) 361 for controlling the devices in the expansion section 303 through the expansion section system bus 373; main memory 361a used by the expansion section CPU 361; general-purpose ISA bus 374; an ISA bus controller (ISA•B/C) 363 for interfacing the expansion section system bus 373 and ISA bus 374; the DMA controller (DMAC) 362 for controlling data transfer on the ISA bus 374; a storage means (HDD) 365 connected to the ISA bus 374 to electronically store image data; an HD•FD interface (HD•FDI/F) 364 as the interface of the HDD; a storage means (optical disk device; ODD) 368 connected to the ISA bus 374 to electronically store image data; an SCSI interface 367 as the interface of the storage means 368; the local area network line control means (LAN) 371 used to realize a LAN function; a printer controller means 370 used to realize a printer function; the G4/G3•FAX control means 369 having a FAX control function; and an expansion section image bus 375 used to output image data from the printer controller means 370 to the page memory section 302 through the system image interface 377.

A hard disk HD incorporated in the HDD 365 stores compressed image data as files in units of a page or a document having a plurality of pages, which are managed by search data for searching for the documents.

The above-described operation panel 380 having a keyboard for inputting instructions to the expansion section 303 and a display is connected to the expansion section system bus 373.

The storage means (ODD) 368 is connected to the ISA bus 374 through the SCSI interface 367. The expansion section CPU 361 controls the storage means 368 through the expansion section system bus 373, ISA•B/C 363, and ISA bus 374 using SCSI commands.

The image data I/F means (image data control means) 308 will be described next. The image data I/F means 308 is a device on the image bus 320 which performs image data transfer between the scanner section 4 or printer section 6 and the page memory 323 through the image processing section 5. The image data I/F means 308 also performs image data transfer between, e.g. the printer controller 370 connected to the expansion section image bus 375 in the expansion section 303 and the page memory 323.

The page memory 323 of the page memory section 302 has a large memory space.

Figure 2:
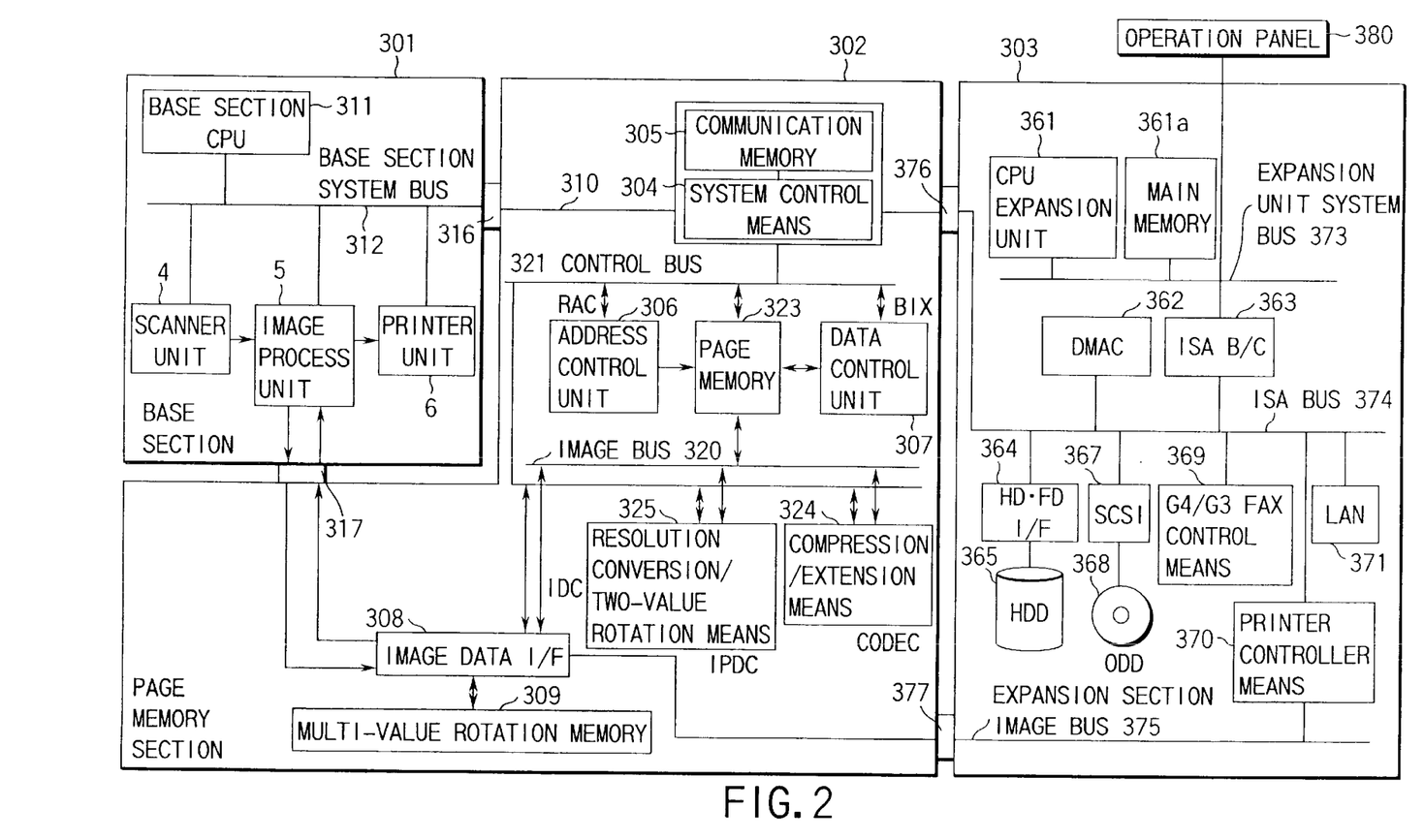
FIG. 2 is a block diagram showing a control system of the digital copying machine.
Figure 3:
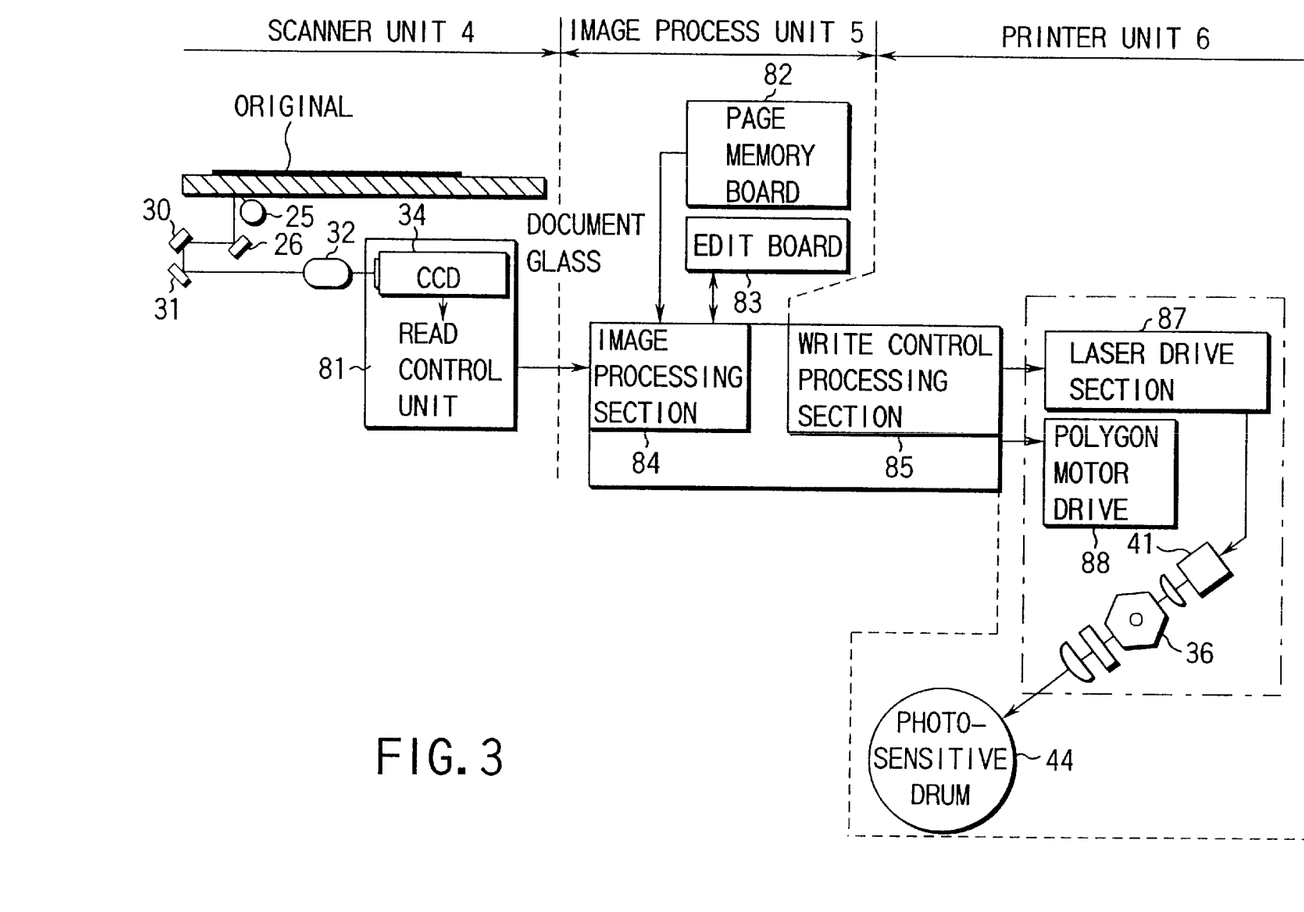
FIG. 3 is a view showing a schematic structure of the digital copying machine shown in FIG. 1.

FIG. 3 shows a schematic structure of the digital copying machine shown in FIGS. 1 and 2. As has been described above, the digital copying machine comprises the scanner section 4, image processing section 5 and printer section 6.

As shown in FIG. 3, to read an original image by the digital copying machine, the original surface is directly illuminated with light from the exposure lamp 25. The reflection light is guided to the 4-channel output CCD 34 using the mirrors 26, 30 and 31 and imaging lens 32. This optical image data is photoelectrically converted by the 4-channel output CCD 34 to charge signals in units of a plurality of (7,500 for 600 dpi) light-receiving elements. The charge signals are sequentially transferred by a CCD analog shift register (to be described later) in the 4-channel output CCD 34 and output as analog signals.

As is shown in FIG. 3, the control system shown in FIG. 2 comprises a read control section 81 including the 4-channel output CCD 34, a page memory board 82, an edition board 83, an image processing section 84, a write control section 85, a laser driving section 87, and a polygon motor drive 88. A laser beam from the semiconductor laser 41 is deflected by the polygon mirror 36 and guided to the photosensitive drum 44.

Figure 4:
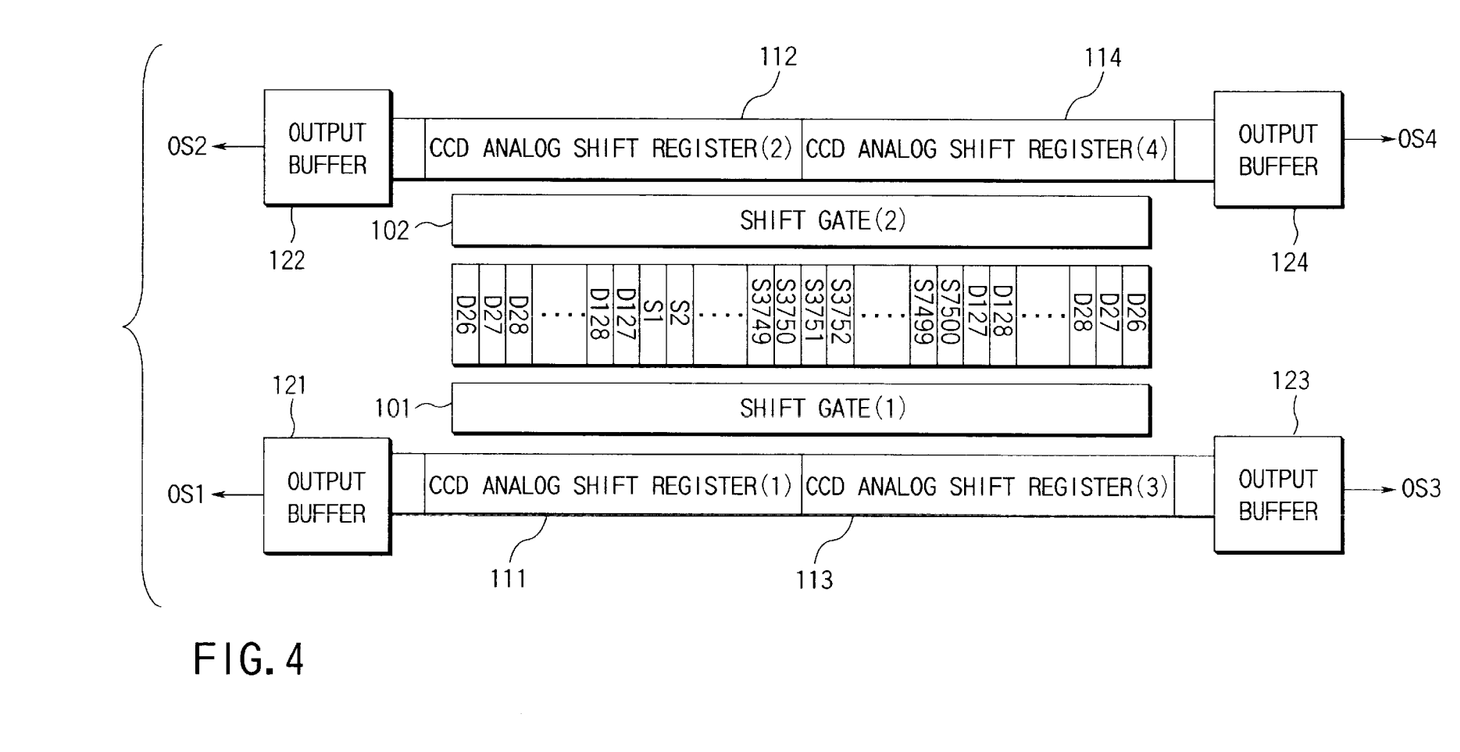
FIG. 4 is a view showing the structure of a 4-channel output CCD.

FIG. 4 shows a detailed structure of the 4-channel output CCD 34. The 4-channel output CCD 34 comprises light-receiving elements (e.g. photodiodes) S1 to S7500 sequentially arranged, a shift gate 101, a shift gate 102, CCD analog shift registers 111 to 114, and output buffers 121 to 124.

In the 4-channel output CCD 34, as shown in FIG. 4, the signal output is divided into even and odd components, each of which is further divided into left and right channels, thereby forming a 4-channel output system. Hence, four CCD analog shift registers 111, 112, 113 and 114 are present. The CCD analog shift register 111 transfers odd components of the signal sequentially from the light-receiving element at the left end. The CCD analog shift register 112 transfers even components of the signal sequentially from the light-receiving element at the left end. The CCD analog shift register 113 transfers odd components of the signal sequentially from the light-receiving element at the right end. The CCD analog shift register 114 transfers even components of the signal sequentially from the light-receiving element at the right end.

Signals from the light-receiving elements S3749, S3750, S3751 and S3752 adjacent to each other at the center of the light-receiving elements S1 to S7500 are finally output from the left and right channels of the odd and even components. Control signals (transfer clock, shift gate signal, reset signal, and clamp signal) necessary for driving the 4-channel output CCD 34 are generated by the CCD driving function of the high-speed scanner control ASIC (to be described later).

Figure 5:
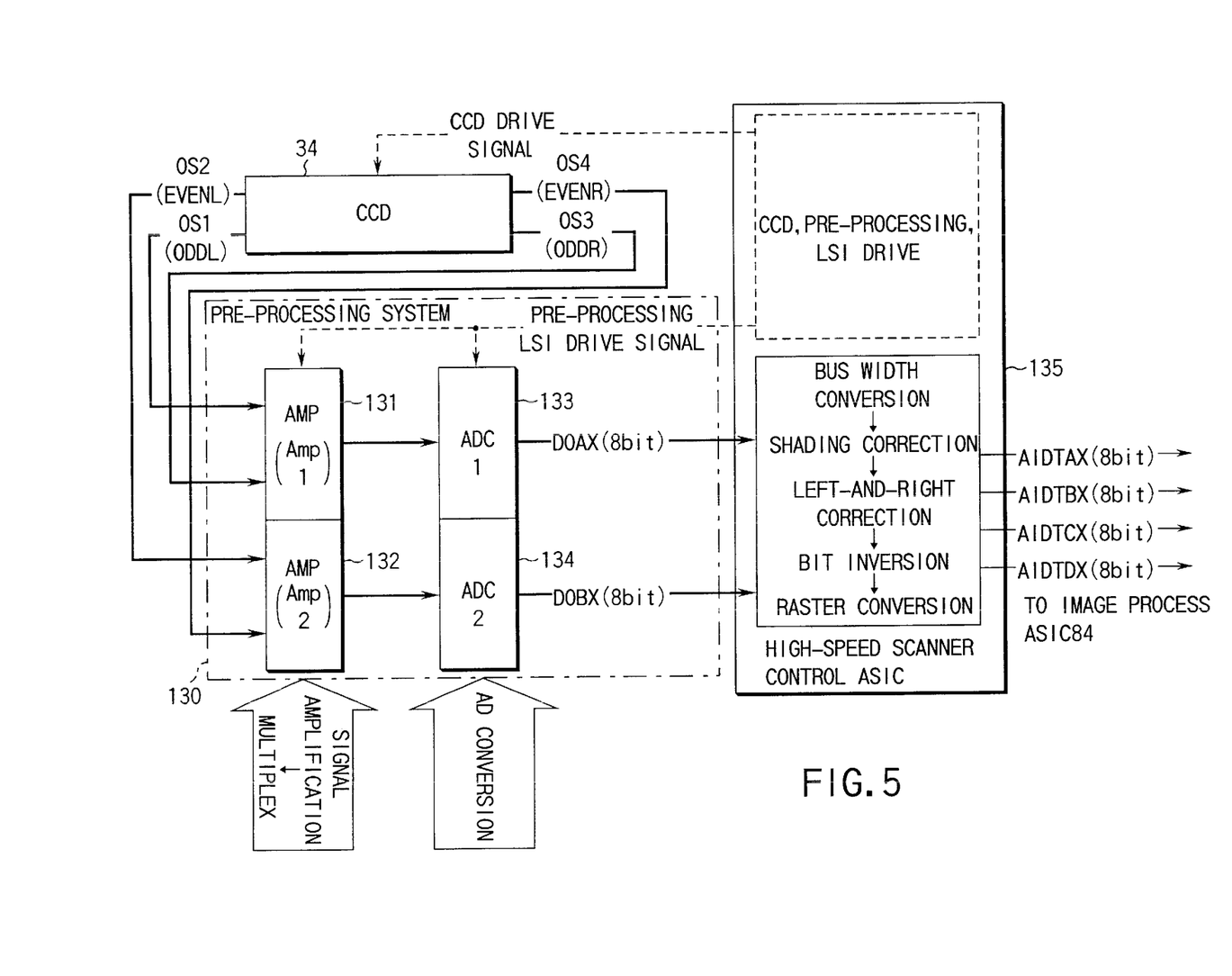
FIG. 5 is a view showing structures of a conventional preprocessing system and high-speed scanner control ASIC.

FIG. 5 shows the structures of a preprocessing system 130 and a high-speed scanner control ASIC 135 which transfer image data in the 4-channel output CCD 34 incorporated in the conventional read control section 81.

To begin with, the structure of the prior art will be described, thereby to make clear the subject matter of the present invention.

The preprocessing system 130 comprises amplifiers 131 and 132 and A/D converters 133 and 134.

In the preprocessing system 130, analog signals output from the 4-channel output CCD 34 are sampled and amplified by the amplifiers (Amp: analog signal processing integrated circuits) 131 and 132 in units of a pixel signal.

Each of the amplifiers 131 and 132 used can parallel-process two channels by one chip. The left and right channels (output terminals OS1 and OS3) of odd components of pixel signals from the 4-channel output CCD 34 are input to the amplifier 131. The left and right channels (output terminals OS2 and OS4) of even components of pixel signals from the 4-channel output CCD 34 are input to the amplifier 132.

In each of the amplifiers 131 and 132, pixel signals from the left and right channels of the 4-channel output CCD 34 are parallel-processed (sampling and amplification) and synthesized into one channel (multiplexing). The amplifier 131 synthesizes left and right signals of odd components into one channel. The amplifier 132 synthesizes left and right signals of even components into one channel. The signals are output from the amplifiers 131 and 132.

The amplifier 131 processes left and right pixel signals of odd components from the 4-channel output CCD 34 together. The amplifier 132 processes left and right pixel signals of even components from the 4-channel output CCD 34 together. The distortion in left and right signals of each of the even and odd components of the output signal from the 4-channel output CCD 34 can be prevented from depending on a variance between chips (variance in circuit characteristics due to the difference between chips) of the amplifiers (131 and 132).

In this case, the signal output rate from the amplifiers 131 and 132 is twice the signal input rate to the amplifiers 131 and 132. An analog signal corresponding to each pixel, which has been amplified to a level appropriate for signal processing and output from the amplifier 131 or 132, is A/D-converted by an A/D converter (ADC 133 or 134) into a digital signal.

The amplifier 131 samples and amplifies, in parallel, pixel signals of left and right channels of odd components output from the 4-channel output CCD 34 and synthesizes the signals into one channel. The analog signal output from this amplifier 131 is A/D-converted by the A/D converter 133. The amplifier 132 samples and amplifies, in parallel, pixel signals of left and right channels of even components output from the 4-channel output CCD 34 and synthesizes the signals into one channel. The analog signal output from this amplifier 132 is A/D-converted by the A/D converter 134. Since the resolving power of the A/D converters 133 and 134 used is 8-bits (bit: 256 steps), each pixel data comprises 8 bits.

In this way, pixel signals (analog signals) output from the 4-channel output CCD 34 on the basis of image information (input to the 4-channel output CCD 34 as optical image data) read by the 4-channel output CCD 34 are amplified and synthesized by the amplifiers 131 and 132. The signals are A/D-converted to digital signals by the A/D converters 133 and 134. The series of processing operations are called preprocessing in the scanner section 4 and constitute the preprocessing system 130.

Control signals (sample/hold pulse, synthesis signal, and clamp signal) necessary for driving the amplifiers 131 and 132 and AD conversion clocks necessary for A/D conversion processing by the A/D converters 133 and 134 are generated by the preprocessing LSI driving function of the high-speed scanner control ASIC 135. Preprocessed pixel signals (8-bit data per pixel; hereinafter referred to as image data) based on image information are input to the high-speed scanner control ASIC 135 and subjected to shading correction processing, left/right correction processing and raster conversion processing in the high-speed scanner control ASIC 135.

A first embodiment of the present invention will now be described.

Figure 6:
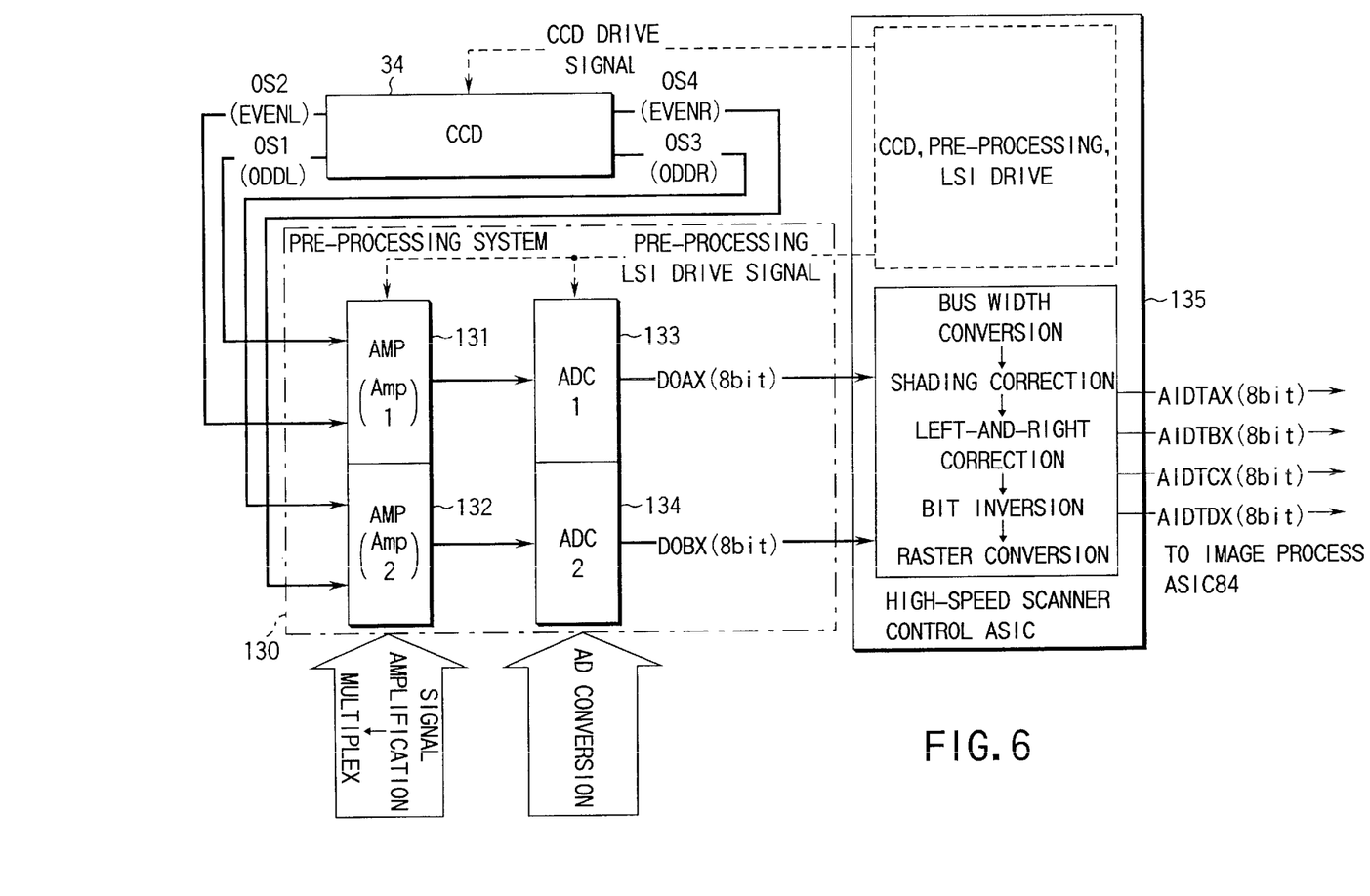
FIG. 6 is a block diagram showing structures of a preprocessing system and high-speed scanner control ASIC according to a first embodiment of the present invention.

FIG. 6 shows structures of a preprocessing system 130 and a high-speed scanner control ASIC 135 for performing image data transfer in a 4-channel output CCD 34 provided in a read control section 81 according to the first embodiment of the invention. The structural elements common to those in the prior art shown in FIG. 5 are denoted by like reference numerals, and a description thereof is omitted.

In the first embodiment, where outputs are multiplexed with use of an LSI (amplifier, etc.) in order to reduce the scale of the circuit configuration, left-side even and odd output components from the 4-channel output CCD 34 are multiplexed, and right-side even and odd output components from the 4-channel output CCD 34 are multiplexed. In this structural feature, the first embodiment differs from the prior art shown in FIG. 5.

In FIG. 6, a left odd-component image signal (ODDL) output from the output terminal OS1 of 4-channel out put CCD 34 is input to the amplifier 131. A left even-component image signal (EVENL) output from the output terminal OS2 of 4-channel output CCD 34 is input to the amplifier 131. A right odd-component image signal (ODDR) output from the output terminal OS3 of 4-channel output CCD 34 is input to the amplifier 132. A right even-component image signal (EVENR) output from the output terminal OS4 of 4-channel output CCD 34 is input to the amplifier 132.

According to the first embodiment, even if the inside of the LSI is affected by crosstalk or switching, the output image is not influenced by right-and-left variance, and the output image with high fidelity to the original can be read. Even if there is influence due to crosstalk or switching, it acts on adjacent pixels. If the resolution for reading is assumed to be 600 dpi, the range of reading for one pixel is 42.3 $\mu$m and there is little influence.

Since independent amplifiers are used for right and left parts of one line, there may be an influence due to a difference in signal transmission path (i.e. a difference in amplifiers). The influence due to a difference in transmission path, however, can be eliminated by performing right/left correction, that is, by correcting one of right and left outputs so that both signals corresponding to the center of the CCD line may coincide.

Where CCD output signals are made to flow in a multilayer board, crosstalk on the board can be eliminated by making output signals flow in different layers, for example, by making a left-side output flow in a substrate flow surface and making a right-side output flow in a substrate re-flow surface. Thus, an output image with high fidelity to the original can be read.

A second embodiment of the invention will now be described.

Figure 7:
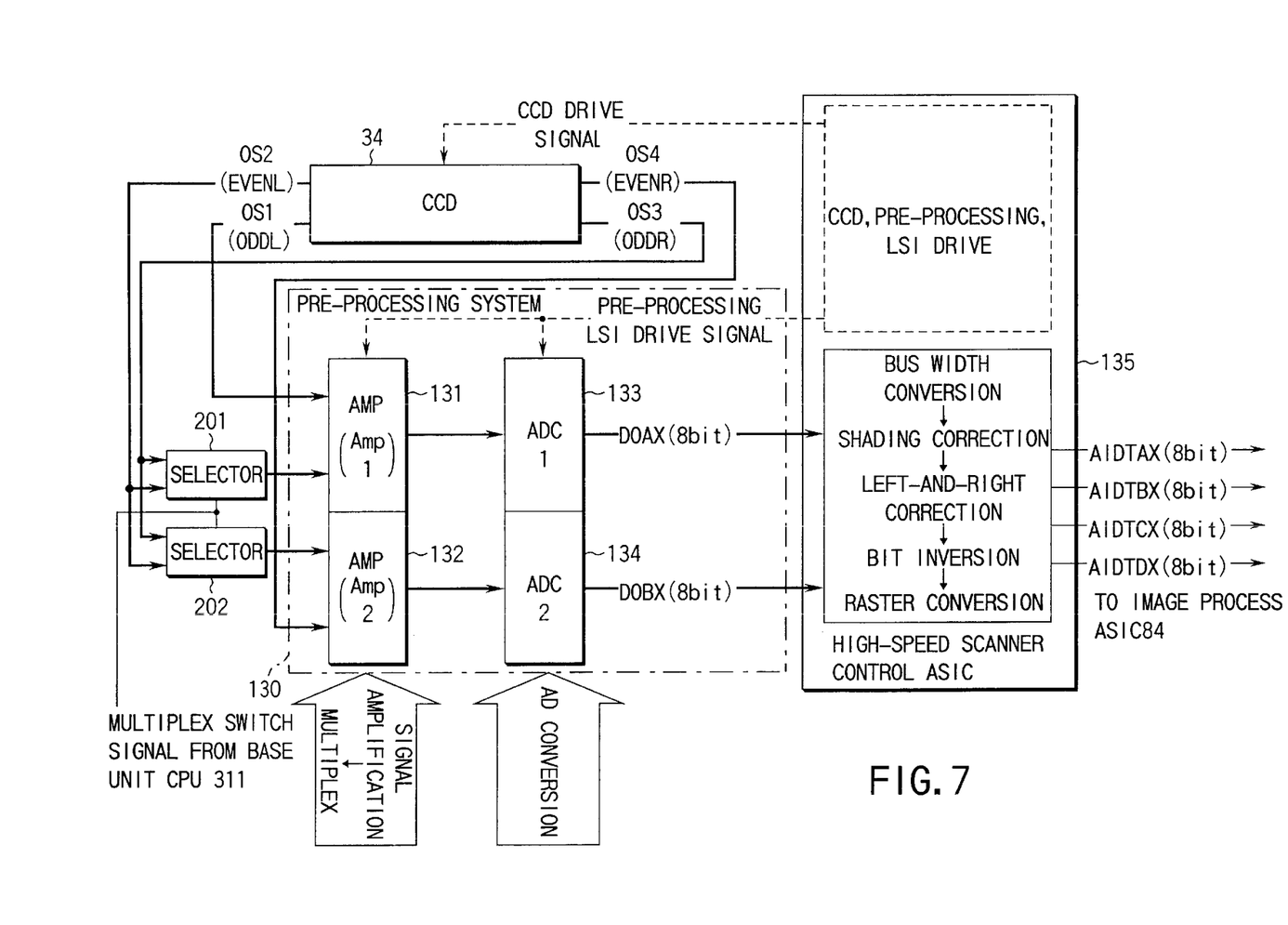
FIG. 7 is a block diagram showing structures of a preprocessing system and high-speed scanner control ASIC according to a second embodiment of the present invention.
Figure 8:
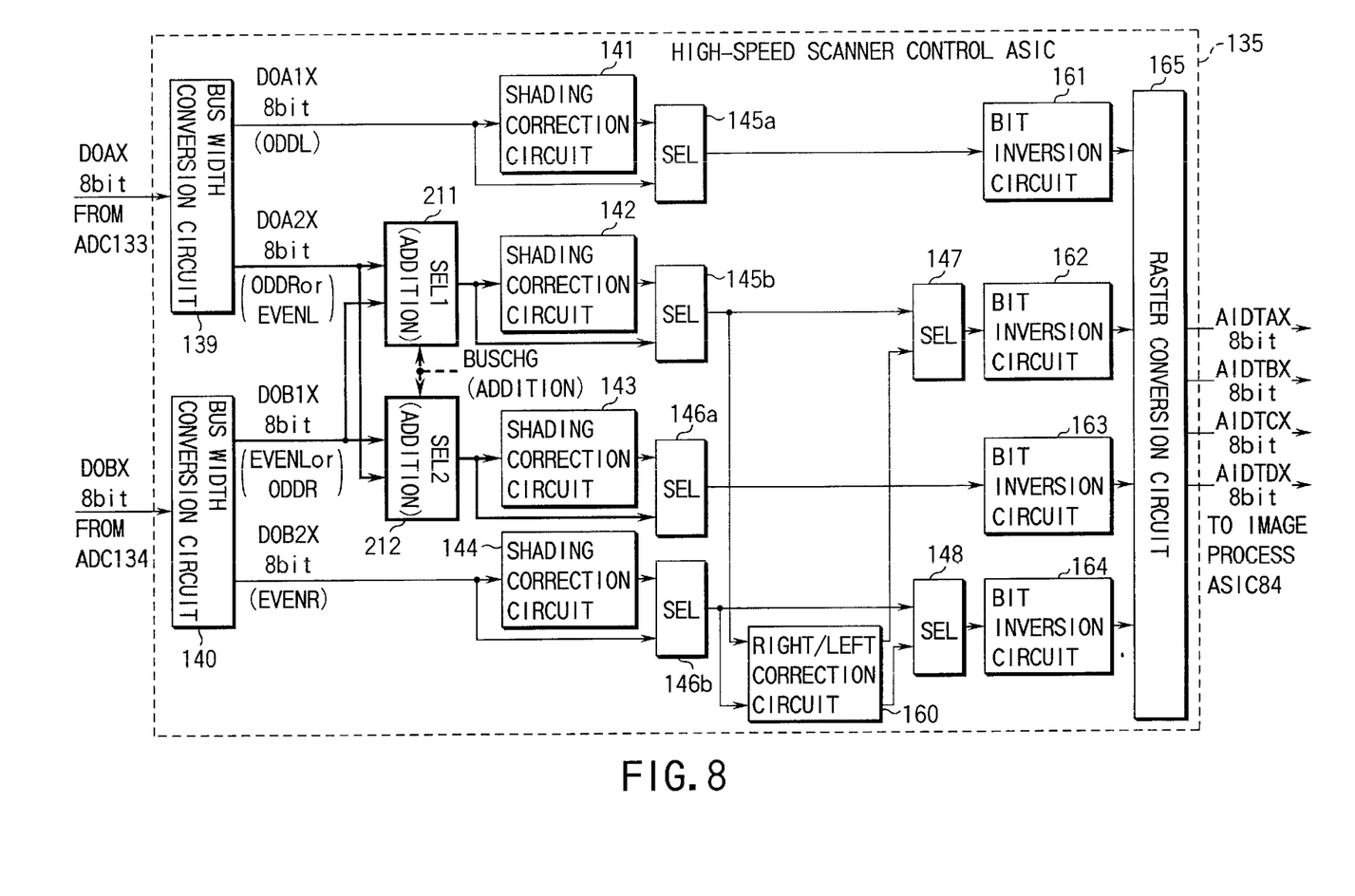
FIG. 8 is a block diagram showing the structure of the high-speed scanner control ASIC according to the second embodiment of the invention.

FIGS. 7 and 8 show structures of a preprocessing system 130 and a high-speed scanner control ASIC 135 for performing image data transfer in a 4-channel output CCD 34 provided in a read control section 81 according to the second embodiment of the invention.

In the second embodiment, selectors are provided at the front stage of the amplifiers to select outputs to be delivered to the amplifiers. There is provided means for subjecting outputs from the amplifiers to shading correction, performing right/left correction to correct one of right and left outputs so that both signals corresponding to the center of the CCD line may coincide, and rearranging the order of 4-channel output signals in a predetermined order. In addition, there is provided a means for switching the multiplexing method. For example, the control panel is provided with a switch for switching the odd/even multiplexing and right/left multiplexing.

In FIG. 7, selectors 201 and 202 are provided between the 4-channel output CCD 34 and the amplifiers 131 and 132. The structural elements common to those in the prior art shown in FIG. 5 are denoted by like reference numerals, and a description thereof is omitted.

Specifically, in FIG. 7, a left odd-component image signal (ODDL) output from the output terminal OS1 of 4-channel output CCD 34 is input to the amplifier 131. A left even-component image signal (EVENL) output from the output terminal OS2 of 4-channel output CCD 34 is input to the selectors 201 and 202. A right odd-component image signal (ODDR) output from the output terminal OS3 of 4-channel output CCD 34 is input to the selectors 201 and 202. A right even-component image signal (EVENR) output from the output terminal OS4 of 4-channel output CCD 34 is input to the amplifier 132.

The selectors 201 and 202 are switched by multiplex switch signals from the basic section CPU 311.

Where the odd/even multiplexing is effected by switching, the left even-component image signal (EVENL) is input to the amplifier 131 and the right odd-component image signal (ODDR) is input to the amplifier 132.

Where the right/left multiplexing is effected by switching, the left even-component image signal (EVENL) is input to the amplifier 132 and the right odd-component image signal (ODDR) is input to the amplifier 131.

FIG. 8 shows an example of a detailed structure of the high-speed scanner control ASIC 135 according to the second embodiment of the invention. Specifically, the high-speed scanner control ASIC 135 comprises bus width conversion circuits 139 and 140; a selector (SEL1) 211; a selector (SEL2) 212; shading correction circuits 141, 142, 143 and 144; selectors (SEL) 145a, 145b, 146a, 146b, 147 and 148; a right/left correction circuit 160; bit inversion circuits 161, 162, 163 and 164; and a raster conversion circuit 165.

Image data preprocessed by the preprocessing system 130 is input to the high-speed scanner control ASIC 135 in two channels as DOAX (8-bit: right/left synthesized data of odd components, or odd/even synthesized left-component data) and DOBX (8-bit: right/left synthesized data of even components, or odd/even synthesized right-component data).

All processing in the high-speed scanner control ASIC 135 is performed for image data DOAX, DOBX digitized in the preprocessing system 130.

The image data DOAX is passed through the bus width conversion circuit 139 and divided into left-odd component data and right-odd component data where right/left multiplexing was effected by switching in the preceding stage, or into left-odd component data and left-even component data where odd/even multiplexing was effected by switching in the preceding stage.

The image data DOBX is passed through the bus width conversion circuit 140 and divided into left-even component data and right-even component data where right/left multiplexing was effected by switching in the preceding stage, or into right-odd component data and right-even component data where odd/even multiplexing was effected by switching in the preceding stage.

More specifically, where the right/left multiplexing was effected by switching in the preceding stage, the DOAX (8-bit) which is right/left synthesized data of odd components is divided by the bus width conversion circuit 139 into DOA1X (8-bit: data of left-odd component (ODDL)) and DOA2X (8-bit: data of right-odd component (ODDR)), and the DOBX (8-bit) which is right/left synthesized data of even components is divided by the bus width conversion circuit 140 into DOB1X (8-bit: data of left-even component (EVENL)) and DOB2X (8-bit: data of right-even component (EVENR)).

Where the odd/even multiplexing was effected by switching in the preceding stage, the DOAX (8-bit) which is odd/even synthesized data of left components is divided by the bus width conversion circuit 140 into DOA1X (8-bit: data of left-odd component (ODDL)) and DOA2X (8-bit: data of left-even component (EVENL)), and the DOBX (8-bit) which is odd/even synthesized data of right components is divided by the bus width conversion circuit 140 into DOB1X (8-bit: data of right-odd component (ODDR)) and DOB2X (8-bit: data of right-even component (EVENR)).

The resultant output data DOA2X, DOB1X is input to the selector (SEL1) 211 and selector (SEL2) 212 and switched by the selector (SEL1) 211 and selector (SEL2) 212 in accordance with multiplex switch signals from the basic section CPU 311.

Specifically, where the right/left multiplexing was effected by switching in the preceding stage, DOA2X is delivered as data of right-odd component (ODDR) from the selector 211 to the shading correction circuit 142 and selector 145b, and DOB1X is delivered as data of left-even component (EVENL) from the selector 212 to the shading correction circuit 143 and selector 146a.

Where the odd/even multiplexing was effected by switching in the preceding stage, DOA2X is delivered as data of left-even component (EVENL) from the selector 212 to the shading correction circuit 143 and selector 146a, and DOB1X is delivered as data of right-odd component (ODDR) from the selector 211 to the shading correction circuit 142 and selector 145b.

Accordingly, the two-channel input image data is divided into four channels by the bus width conversion circuits 139 and 140. For example, if two-channel image data DOAX, DOBX are input with a data rate of 40 MHz per channel, the image data subjected to bus width conversion processing is converted to 4-channel data, DOA1X, DOA2X, DOB1X and DOB2X, and is output with a data rate of 20 MHz per channel.

The image data divided by bus width conversion processing, i.e. DOA1X (8-bit: data of left-odd component), DOA2X (8-bit: data of right-odd component or left-even component), DOB1X (8-bit: data of left-even component or right-odd component) and DOB2X (8-bit: right data of even component), is subjected to shading correction processing by the shading correction circuits 141, 142, 143 and 144. According to the structure of the high-speed scanner control ASIC 135, as shown in FIG. 8, four shading correction circuits are provided, and the 4-channel image data subjected to bus width conversion processing, DOA1X, DOA2X, DOB1X and DOB2X, can be parallel-processed simultaneously.

A brief description will now be given of the shading correction function.

Shading correction is classified into white-level shading correction and black-level shading correction. The high-speed scanner control ASIC 135 has a circuit configuration based on algorithms which can perform both corrections.

In the white-level shading correction, the data (image data) on the original read by the 4-channel output CCD 34 is divided in units of a pixel by while-reference data read by the 4-channel output CCD 34 in advance. Thereby, the read data (image data) on the original is normalized (corrected) in units of a pixel. Thus, a variance in illuminance and (enlargement, reduction) processing, γ-correction density conversion processing, and gray-scale processing.

As has been described above, according to the second embodiment, when an effect due to a right/left variance such as a ghost image resulting from switching is to be prevented (e.g. in the case of an image with an intermediate gray scale such as a photograph), the odd/even multiplexing is selected. when a resolution is particularly important (e.g. in the case of an image with less intermediate gray-scale component such as a character), the right/left multiplexing is selected. Thereby, the user can select a desired image in accordance with an image to be read.

If the selection of the odd/even multiplexing for the photograph mode and the selection of the right/left multiplexing for the character mode is preset, optimal images can always be obtained.

According to the embodiments of the invention as described above, when an image is read by the 4-channel output CCD, output signals are separated on the circuit board, whereby crosstalk between the output signals can be prevented. In addition, the left-side even and odd output components and the right-side odd and even output components are multiplexed respectively. Thus, even if the inside of the LSI is adversely affected by crosstalk or switching, the output image which is free a variance in sensitivity of each light-receiving element of 4-channel output CCD 34 can be corrected.

In the black-level shading correction, for instance, influence of dark current occurring in the light-receiving element in the 4-channel output CCD 34, which is a main factor of distortion of black level, is cancelled (corrected) by subtracting, in units of a pixel, black-reference data read in advance by the four-channel output CCD 34 from the read data (image data) on the original read by the 4-channel output CCD 34 and white-reference data.

The shading-corrected image data is corrected, where necessary, by the right/left correction circuit 160, with respect to left/right data of even and odd components. The corrected data is then bit-inverted by the bit inversion circuits 161, 162, 163 and 164. The resultant image data is rearranged in order by the raster conversion circuit 165.

The image data subjected to the series of processes in the high-speed scanner control ASIC 135 is output from the high-speed scanner control ASIC 135 as AIDTAX (8-bit), AIDTBX (8-bit), AIDTCX (8-bit) and AIDTDX (8-bit) and delivered to the image processing ASIC 84. The image data input to the image processing ASIC 84 is subjected to a series of data processes by image processing such as filtering processing, range correction processing, magnification conversion from a right/left variance and has high fidelity to the original can be read.

Furthermore, optimal images can always be read by switching the odd/even multiplexing and the right/left multiplexing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reading apparatus comprising:
 a 4-division photoelectric conversion element for receiving light at four division image-feed areas consisting of an odd area located on a left side in a main scan direction, an odd area on a right side in the main scan direction, an even area on the left side in the main scan direction, and an even area on the right side in the main scan direction;
 a first selector for selecting one of output signals from the left-side even area and right-side odd area of said four division areas of the 4-division photoelectric conversion element which has received light;
 a first amplifier for synthesizing and amplifying an output signal from the left-side even area and one of the output signals, which has been selected by said first selector, from the left-side even area and right-side odd area of said four division areas of the 4-division photoelectric conversion element which has received light;
 a second amplifier for synthesizing and amplifying an output signal from the right-side even area and one of the output signals, which has been selected by said first selector, from the left-side even area and right-side odd area of said four division areas of the 4-division photoelectric conversion element which has received light;
 a first bus width conversion circuit for dividing the output signal from the left-side odd area amplified and synthesized by the first amplifier, and one of the output signals, which has been selected by the first selector, from the left-side even area and the right-side odd area;
 a second bus width conversion circuit for dividing the output signal from the right-side even area amplified and synthesized by the second amplifier, and one of the output signals, which has been selected by the first selector, from the left-side even area and the right-side odd area;
 a second selector for selecting one of the output signals, which has been divided by the first bus width conversion circuit, from the left-side even area and the right-side odd area, and one of the output signals, which has been divided by the second bus width conversion circuit, from the left-side even area and the right-side odd area;
 a correction circuit for correcting left-side and right-side output signals with respect to the output signal from the left-side odd area, which has been divided by the first bus width conversion circuit, one of the output signals from the left-side even area and right-side odd area, which has been selected by the second selector, the output signal from the right-side even area, which has been divided by the second bus width conversion circuit, and one of the output signals from the left-side even area and right-side odd area, which has been selected by the second selector; and
 a control circuit for controlling the output signals selected by the first selector and the second selector.

2. An image reading apparatus according to claim 1, wherein said control circuit is a CPU which outputs multiplex switch signals to the first selector and the second selector, thereby controlling the output signals.

3. An image reading method comprising the steps of:
 providing a 4-division photoelectric conversion element for receiving light at four division image-feed areas consisting of an odd area located on a left side in a main scan direction, an odd area on a right side in the main scan direction, an even area on the left side in the main scan direction, and an even area on the right side in the main scan direction; and
 selecting one of two modes:
  one of the two modes being such that output signals from the left-side odd area and left-side even area of said four division areas of the 4-division photoelectric conversion element which has received light are synthesized and amplified, and output signals from the right-side even area and left-side even area are synthesized and amplified, and the other of the two modes being such that output signals from the left-side odd area and right-side odd area of said four division areas of the 4-division photoelectric conversion element which has received light are synthesized and amplified, and output signals from the right-side even area and right-side odd area are synthesized and amplified.

* * * * *